United States Patent
Bronold

(10) Patent No.: US 7,713,332 B2
(45) Date of Patent: May 11, 2010

(54) CARBON DIOXIDE SEPARATION SYSTEM FOR FUEL CELL SYSTEM

(75) Inventor: Matthias Bronold, Berlin (DE)

(73) Assignees: Samsung SDI Co., Ltd., Maetun-dong, Yeongtong-gu, Suwon-si, Gyeonggi-do (KR); Samsung SDI Germany GmbH, Berlin (DE)

( * ) Notice: Subject to any disclaimer, the term of this patent is extended or adjusted under 35 U.S.C. 154(b) by 575 days.

(21) Appl. No.: 11/701,425

(22) Filed: Feb. 2, 2007

(65) Prior Publication Data
US 2007/0180988 A1 Aug. 9, 2007

(30) Foreign Application Priority Data
Feb. 6, 2006 (EP) .................................. 06101312
Jan. 23, 2007 (KR) ..................... 10-2007-0007184

(51) Int. Cl.
*B01D 53/22* (2006.01)
(52) U.S. Cl. .................. 95/51; 95/45; 95/46; 96/4; 96/6; 96/10; 96/11; 55/410; 429/19; 429/34; 429/38; 429/39; 210/640
(58) Field of Classification Search ............... 95/45, 95/46, 51; 96/4, 6, 10, 11; 55/410; 429/19, 429/34, 38, 39; 210/640
See application file for complete search history.

(56) References Cited
U.S. PATENT DOCUMENTS
5,989,318 A * 11/1999 Schroll .......................... 96/6

| | | | |
|---|---|---|---|
| 6,869,716 B2 | 3/2005 | Neutzler | |
| 6,942,718 B1* | 9/2005 | Schmidt | 95/46 |
| 7,175,693 B2* | 2/2007 | Spadaccini et al. | 95/46 |
| 7,238,224 B2* | 7/2007 | Kent | 95/46 |
| 2002/0192525 A1* | 12/2002 | Neutzler | 429/34 |

(Continued)

FOREIGN PATENT DOCUMENTS
DE         100 31 241 A1     1/2002

(Continued)

OTHER PUBLICATIONS

*European Search Report* from the European Patent Office issued in Applicant's corresponding European Patent Application No. 06101312.4 dated Apr. 19, 2006.

*Primary Examiner*—Jason M Greene
(74) *Attorney, Agent, or Firm*—Robert E. Bushnell, Esq.

(57) ABSTRACT

A carbon dioxide separation system for a fuel cell system having a small volume and weight of a separation device and of a membrane, at simultaneous increase of the separated volume of carbon dioxide, comprises a separation device for containing a fluid phase, a carbon dioxide phase, and a two phase fluid including fluid and carbon dioxide. The separation device comprises a two phase fluid inlet, a fluid outlet, a carbon dioxide outlet, a carbon dioxide separation membrane, and a flow restrictor creating a backpressure which presses separated carbon dioxide through the carbon dioxide separation membrane. The flow restrictor comprises at least one narrow aperture, and is mounted downstream of the separation device. The carbon dioxide separation membrane is positioned in the separation device in such a manner that at least a part of the total membrane area is arranged above a two phase fluid level and is in touch with carbon dioxide contained in the separation device above the two phase fluid level.

17 Claims, 4 Drawing Sheets

U.S. PATENT DOCUMENTS

2004/0016389 A1   1/2004  Shields
2005/0008923 A1*  1/2005  Malhotra .................... 429/38
2005/0066812 A1*  3/2005  Vesper et al. ................ 95/46
2006/0288870 A1*  12/2006  Kang et al. ..................... 96/6

FOREIGN PATENT DOCUMENTS

DE     100 34 401 A1 *  1/2002
EP     1 383 191 A1    1/2004

\* cited by examiner

CARBON DIOXIDE SEPARATION SYSTEM FOR FUEL CELL SYSTEM

CLAIM OF PRIORITY

This application makes reference to, incorporates the same herein, and claims all benefits accruing under 35 U.S.C. §119 from an application for CARBON DIOXIDE SEPARATION SYSTEM FOR FUEL CELL SYSTEM filed in the European Patent Office on the $6^{th}$ day of Feb. 2006 and there duly assigned Ser. No. 06101312.4 and an application for CARBON DIOXIDE SEPARATION SYSTEM FOR FUEL CELL SYSTEM earlier filed in the Korean Intellectual Property Office on the $23^{rd}$ day of Jan. 2007 and there duly assigned Ser. No. 10-2007-0007184.

BACKGROUND OF THE INVENTION

1. Technical Field

The present invention relates to a carbon dioxide separation system for a fuel cell system and, more particularly, to a device for separating a carbon dioxide gas from a fuel stream in a direct fuel cell system, especially in a direct methanol fuel cell (DMFC) system, which is used to supply power to a mobile electronic device.

2. Related Art

FIG. 1 is a schematic diagram of a direct methanol fuel cell (DMFC) system disclosed in U.S. Patent Publication No. 2004/016389A1.

Referring to FIG. 1, a fuel cell stack 10 has an air inlet 11 and an air outlet 13. An air pump or fan 12 supplies reaction air to a stack cathode through the air inlet 11. A heat exchanger 50 is mounted in an outlet stream of a fuel cell cathode. A fan 55 is used to cool the heat exchanger 50, leading to a cooling of the outlet stream and a condensation of water. A two phase flow exits the heat exchanger 50 at an outlet 52. Downstream of the heat exchanger 50, a water separator 60 is mounted in order to separate liquid water from an air stream. The separated water is fed back to the anode cycle of the fuel cell system by a condensation pump 70, while the residual air is vented through an air venting outlet 61 to the ambience.

One indispensable function of the DMFC system is the separation of carbon dioxide from the outlet stream coming out of a stack fuel outlet 16. This outlet stream comprises a mixture of methanol, water and carbon dioxide. For a proper function of the fuel cell, the carbon dioxide has to be separated from the stream prior to the recycling of the fuel stream back into the fuel cell stack 10.

An anode cycle for diluted fuel, comprising a carbon dioxide separator 20 mounted downstream from the stack fuel outlet 16, removes carbon dioxide from the reaction stream and vents it to the ambience through a venting opening 21. In a mixer 22, the reaction stream is mixed with pure fuel from a fuel tank 30. A fuel pump 23 feeds the diluted fuel back to a fuel inlet 15 of the fuel cell stack 10.

European Patent Publication EP 1 383 191 A1 discloses another possible embodiment of a carbon dioxide separation device. Here, the carbon dioxide separation is accomplished in a compartment filled with a fuel mixture having an inlet connected to a stack fuel outlet and an outlet connected to the circulation pump. Carbon dioxide bubbles are separated from the fuel mixture by gravity during the stay time of the fuel mixture within the separation compartment. On top of this separation compartment, a water separator is mounted. There are openings between the carbon dioxide compartment and the water separator leading to the feeding of separated carbon dioxide to the air venting outlet and the separated water into the carbon dioxide separation device (back into the anode cycle), both operations occurring through the action of gravity. The main disadvantage of this embodiment is the strong dependence on the orientation of the device, i.e. the device essentially works only in an upright position. This may also pose problems when the separation device has to be integrated into a flat system set-up as required, for example, for a notebook docking station.

Another embodiment of a carbon dioxide separation device is disclosed in U.S. Pat. No. 6,869,716. Here, the gas separation takes place across a hydrophobic membrane which forms a conduit component around the fuel stream of two phase fluid containing fluid and carbon dioxide. The backpressure needed to press the carbon dioxide through the separation membrane is formed either by a cone-type design of the hydrophobic conduit or by a hydrophilic passageway at the outlet end of the conduit.

The problem with that solution is that it is difficult to manufacture and system-integrate such a tubular hydrophilic membrane with a small diameter. Due to the condensation of water in the compartment which transfers the carbon dioxide to the ambience, the relatively narrow channels might be blocked.

In general, the diffusion rate of a gas across a porous membrane is essentially proportional to the pressure difference between both faces of the membrane, i.e., a higher pressure difference allows for a smaller membrane area, and thus a smaller separation device.

The presented means for creating backpressure only lead to a limited pressure, and thus to a requirement for a relatively large area of separation membrane.

SUMMARY OF THE INVENTION

The present invention provides a carbon dioxide separation system for a fuel cell system with a small volume and weight of a separation device and of the membrane, while simultaneously increasing the separated volume of carbon dioxide.

According to an aspect of the present invention, there is provided a carbon dioxide separation system for a fuel cell system, comprising: a separation device adapted to contain a fluid phase, a carbon dioxide phase, and a two phase fluid consisting of fluid and carbon dioxide, and comprising a two-phase fluid inlet, a fluid outlet, a carbon dioxide outlet, a carbon dioxide separation membrane, and a flow restrictor for creating a backpressure pressing separated carbon dioxide through the carbon dioxide separation membrane, wherein the flow restrictor comprises at least one narrow aperture and is mounted downstream of the separation device, and wherein the carbon dioxide separation membrane is positioned in the separation device in such a manner that at least a part of the total membrane area is arranged above a two phase fluid level and in touch with carbon dioxide contained in the separation device above the two phase fluid level.

The two phase fluid flows through the fluid inlet into the separation device, and the two phase fluid is mostly retained in the separation device because of a small aperture in the fluid outlet. Due to the retaining time of the fluid in the separation device, carbon dioxide bubbles are separated from the fuel mixture by gravity and gas is collected on top of the compartment of the separation device. Due to the continued flow of the two phase fluid into the compartment of the separation device and the narrow aperture of the fluid outlet, the pressure inside the separation device increases, compressing the carbon dioxide above the two phase fluid. Due to the high pressure, carbon dioxide migrates across the membrane.

It is, therefore, possible to create a high backpressure in the membrane-based separation device, thereby reducing the required membrane surface leading to a small carbon dioxide separation device.

The advantage of the present invention is that, by designing the diameter and the length of the flow restrictor in a proper way, arbitrary backpressure levels can be generated within the separation compartment, enabling a perfect match of the membrane properties, the characteristics of a circulation pump, and the system's volume restrictions. Another advantage is that, due to the still macroscopic dimensions of the flow restrictor diameter, small particles in the fuel stream (e.g., loosened catalyst particles) do not block the flow path.

Additionally, the separation system can be used in a tilted position because, depending on the liquid level and the tilt angle, the membrane is at least partially in contact with compressed carbon dioxide, which enables the system to separate a larger volume of carbon dioxide from the internal space of the separation device.

Production costs of the separation system can be lowered because the separation device can be manufactured by, for example, injection modeling.

Finally, if the flow restrictor is integrated into an existing tubing connection, it does not consume additional space within the fuel cell system.

The carbon dioxide separation membrane has the function of serving as the carbon dioxide outlet. That is, no extra outlet means is provided, and the membrane corresponds to an outside wall of the separation device.

The carbon dioxide separation membrane is inside the separation device in contact with carbon dioxide if the membrane serves as the carbon dioxide outlet, or if there an extra carbon dioxide outlet is provided.

The separation device may have a pot shape.

The separation device may be adapted in such a manner that, due to gravity and density, the carbon dioxide phase is located above the two phase fluid, the two phase fluid inlet is arranged on the top of the separation device, and the fluid outlet is arranged on the bottom of the separation device.

The carbon dioxide outlet may be arranged close to the top of the separation device or the bottom of the separation device in order to remove condensed water.

The carbon dioxide separation membrane may be of essentially tubular shape, which divides the separation device into two essentially co-axial compartments, wherein the fluid, the two phase fluid, and compressed carbon dioxide is located in an inner fluid compartment, and a carbon dioxide collection compartment surrounds the inner fluid compartment and transfers the separated carbon dioxide to the carbon dioxide outlet, and wherein an outlet tubing is mounted on a top flange and elongated into the inner fluid compartment through a collection tube. The two phase fluid inlet may be also mounted on the top flange.

Especially, it is possible to use the separation system in different positions. That is, the separation system can be used in a tilted position and also in an overhead position because the membrane—due to its tubular shape—is always at least partially in sole contact with the compressed carbon dioxide inside the tubular formed membrane.

Therefore, the volume of the carbon dioxide separation device can be reduced. The large total area of the membrane leads to a larger rate of migration of carbon dioxide so that it is possible to arrange a larger aperture or more aperture in the fluid outlet leading to a higher flow volume in the separation device and a higher efficiency of the entire system.

The ratio of the total cross section of apertures in the flow restrictor to the cross section of the inner fluid compartment containing the fluid and the two phase fluid in the separation device is preferably not greater than $1/10$.

The flow restrictor may be a capillary tube integrated into a tubing connection in the downstream of the carbon dioxide separation system.

The flow restrictor may be a nozzle integrated into a tubing connection in the downstream of the carbon dioxide separation system. The flow restrictor may be a small orifice in the passage of an outer wall of the separation device to a downstream tubing connection. The flow restrictor may comprise multiple parallel individual backpressure elements of capillaries and/or nozzles of limited aperture type.

In use, the small orifice t yields a limited aperture in the tubing connection to the downstream system components.

In order to limit the volume of the system, a mixer may be integrated into the separation device as a single compartment device.

The separation device may be attached to a mixer as two compartments in one unit, separated by a diaphragm.

The flow restrictor may be a capillary integrated in the internal diaphragm.

The carbon dioxide separation membrane may be of flat or bent shape.

The carbon dioxide separation membrane may be of tubular shape.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully with reference to the accompanying drawings, in which exemplary embodiments of the invention are shown.

Figure 1:
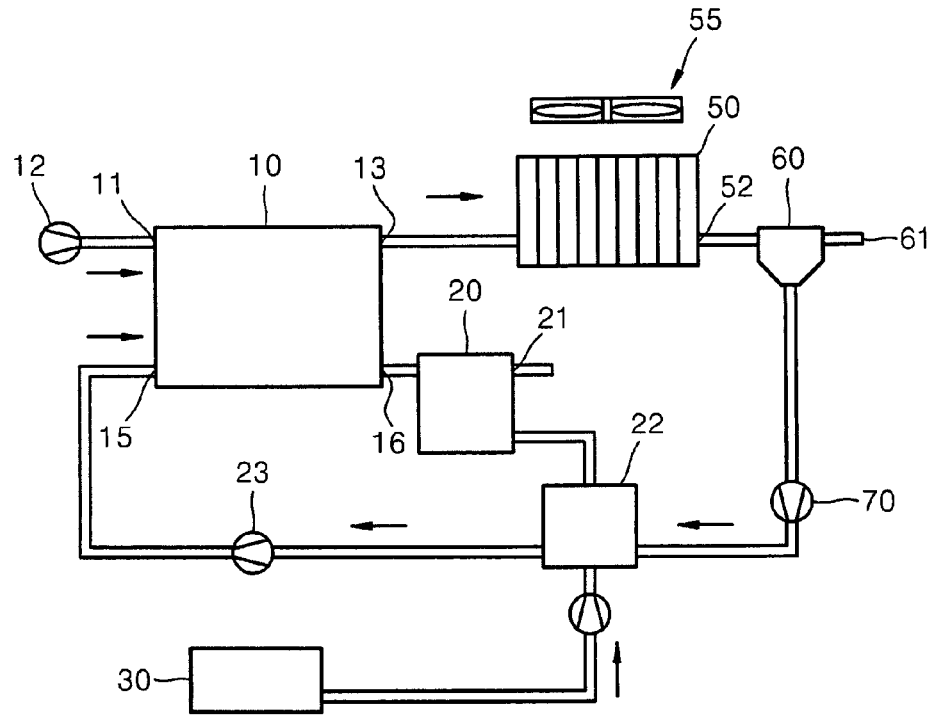
FIG. 1 is a schematic diagram of a conventional direct methanol fuel cell (DMFC) system used to supply power to a mobile electronic device.
Figure 2:
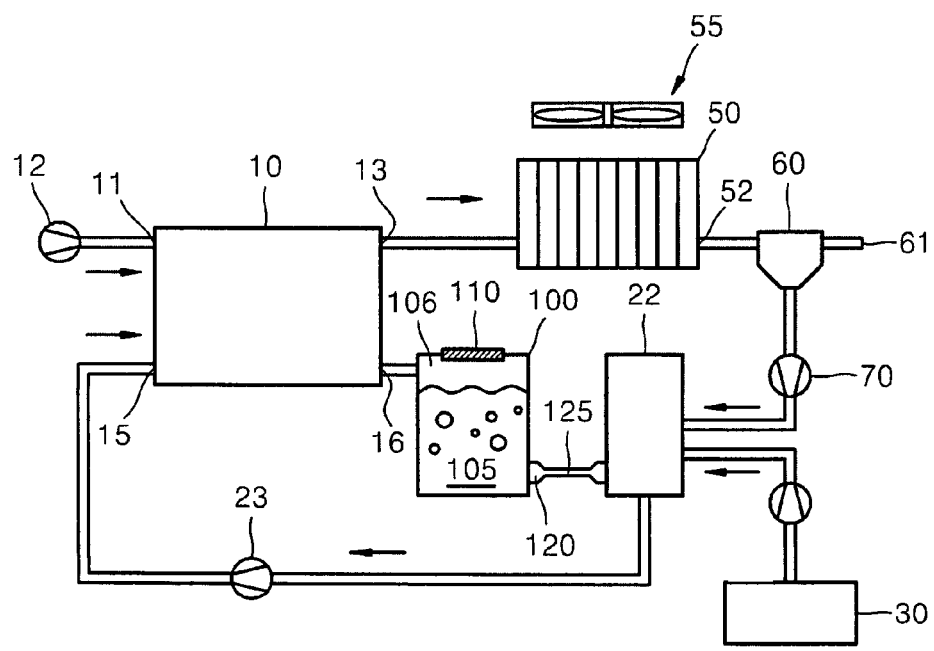
FIG. 2 is a schematic diagram of a fuel cell system comprising a membrane on top of a separation device according to an embodiment of the present invention.

FIG. 2 is a schematic diagram of a fuel cell system comprising a membrane on top of a separation device according to an embodiment of the present invention.

Referring to FIG. 2, two phase fluid 105 consisting of diluted methanol and carbon dioxide bubbles leaves an anode outlet 16 of a stack 10. The two phase fluid 105 passes through a carbon dioxide separation compartment 100 where, due to the retaining time, carbon dioxide bubbles are separated from the liquid and a gas 106 is collected in a top portion of the carbon dioxide separation compartment 100. The carbon dioxide is removed from the carbon dioxide separation compartment 100 through a separation membrane 110 which is essentially selective toward carbon dioxide or gases, and which retains the liquid inside.

The separation membrane 110 can be formed of a porous polytetrafluroethylene (PTFE) material or other types of hydrophobic components. As described in other subsequent embodiments of the present invention, the separation membrane 110 is also in simultaneous contact with the liquid as well as with the two phase fluid 105 and compressed gas volume on top of the fluid.

According to this embodiment of the present invention, the pressure needed to press the gas through the separation membrane 110 is generated and transmitted by a flow restrictor 125, which is located downstream from the carbon dioxide separation compartment 100 in a connection tube 120 connected to a mixer 22. The flow restrictor 125 is formed in the shape of a capillary.

Figure 3:
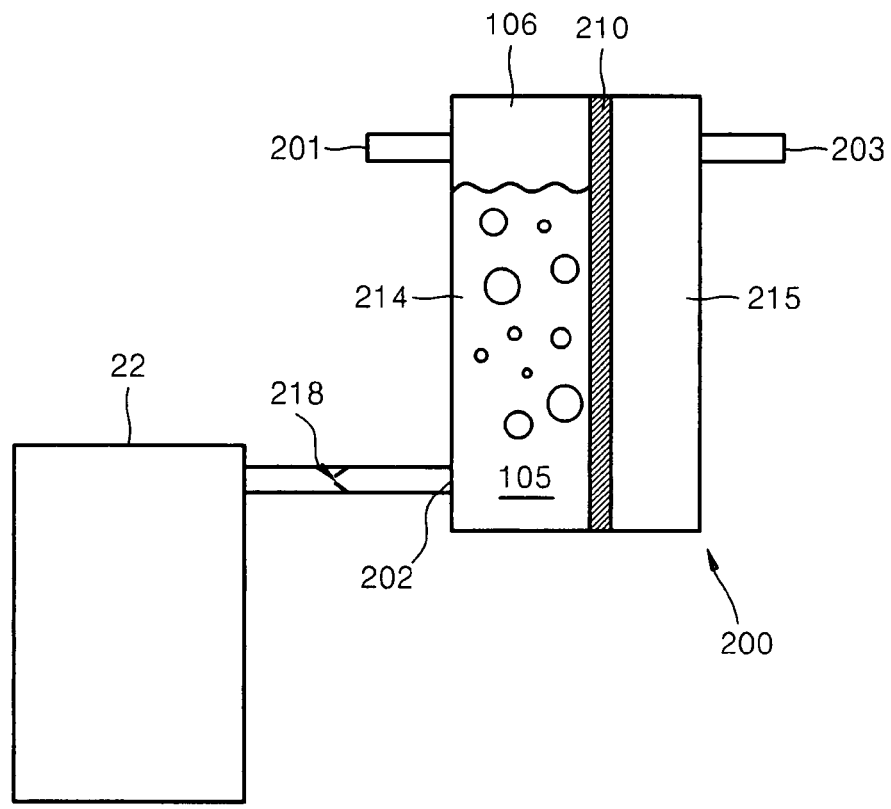
FIG. 3 is a schematic diagram of a part of a fuel cell system comprising a separation device divided into two compartments according to another embodiment of the present invention.

FIG. 3 is a schematic diagram of a part of a fuel cell system comprising a separation device divided into two compartments according to another embodiment of the present invention.

Referring to FIG. 3, the separation device 200 is divided into two compartments by a separation membrane 210. In a fluid compartment 214, the separation membrane 210 is in contact with the two phase fluid 105 which is fed into the separation device 200 through a fluid inlet 201 and with a segregated gas 106. Carbon dioxide migrates through the separation membrane 210 into a carbon dioxide collection compartment 215, and is released through a carbon dioxide outlet 203. The two phase fluid 105 is kept out of the carbon dioxide collection compartment 215 and in the fluid compartment 214 due to the hydrophobic nature of the separation membrane 210.

In this embodiment of the present invention, the backpressure is generated and transmitted through a nozzle 218, which is located downstream from the separation device 200 in a fluid connector 202 connected to the mixer 22.

Figure 4:
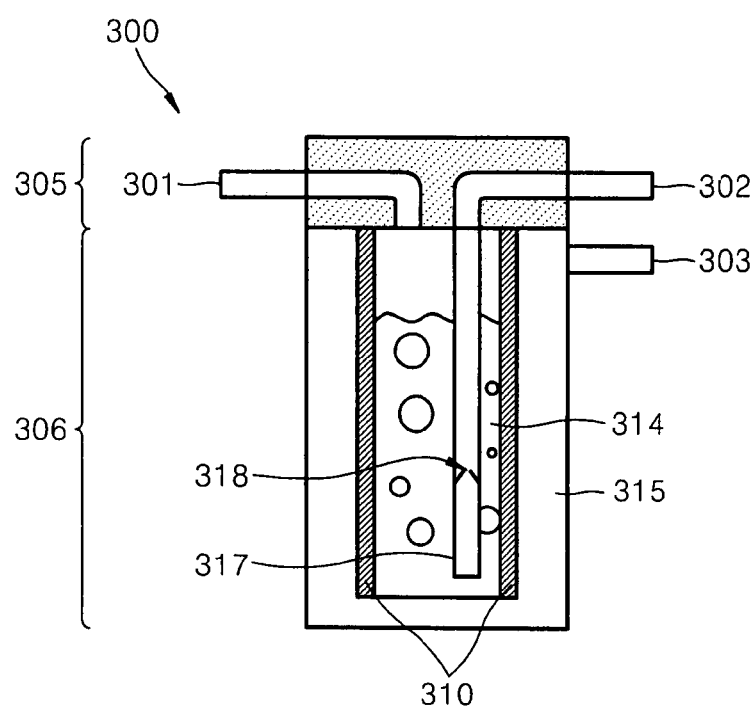
FIG. 4 is a schematic diagram of a separation device wherein a separation membrane is of essentially tubular shape according to an embodiment of the present invention.

FIG. 4 is a schematic diagram of a separation device wherein a separation membrane is of essentially tubular shape according to an embodiment of the present invention.

Referring to FIG. 4, the separation membrane 310 divides the separation device 300 into two essentially co-axial compartments with a two phase fluid in an inner fluid compartment 314, and a carbon dioxide collection compartment 315 surrounding the inner fluid compartment 314 and transferring separated carbon dioxide to a carbon dioxide outlet 303. Outlet tubing 302 is mounted on a top flange 305 and elongates into the inner fluid compartment 314 through a collection tube 317. In this case, a fluid inlet 301 is also mounted on the top flange 305.

In another embodiment of the present embodiment, the fluid inlet 301 and a fluid outlet 302 are mounted on opposite faces of the separation device 300, one on the top flange 305 and the other on the bottom flange 306.

Due to the independence of orientation of the separation device 300, the separation device 300 can be used in many different positions. That is, both flanges 305 and 306 on the top of the separation device 300 and on the bottom of the separation device 300, respectively, correspond to opposite side faces if the separation device 300 is mounted horizontally.

A backpressure element is placed inside the volume of the separation device 300. The backpressure element is a nozzle 318 in the collection tube 317. Alternatively, the backpressure element is designed to be a capillary part in the collection tube 317 or in the flange section, or one or multiple narrow holes in the flange.

Figure 5:
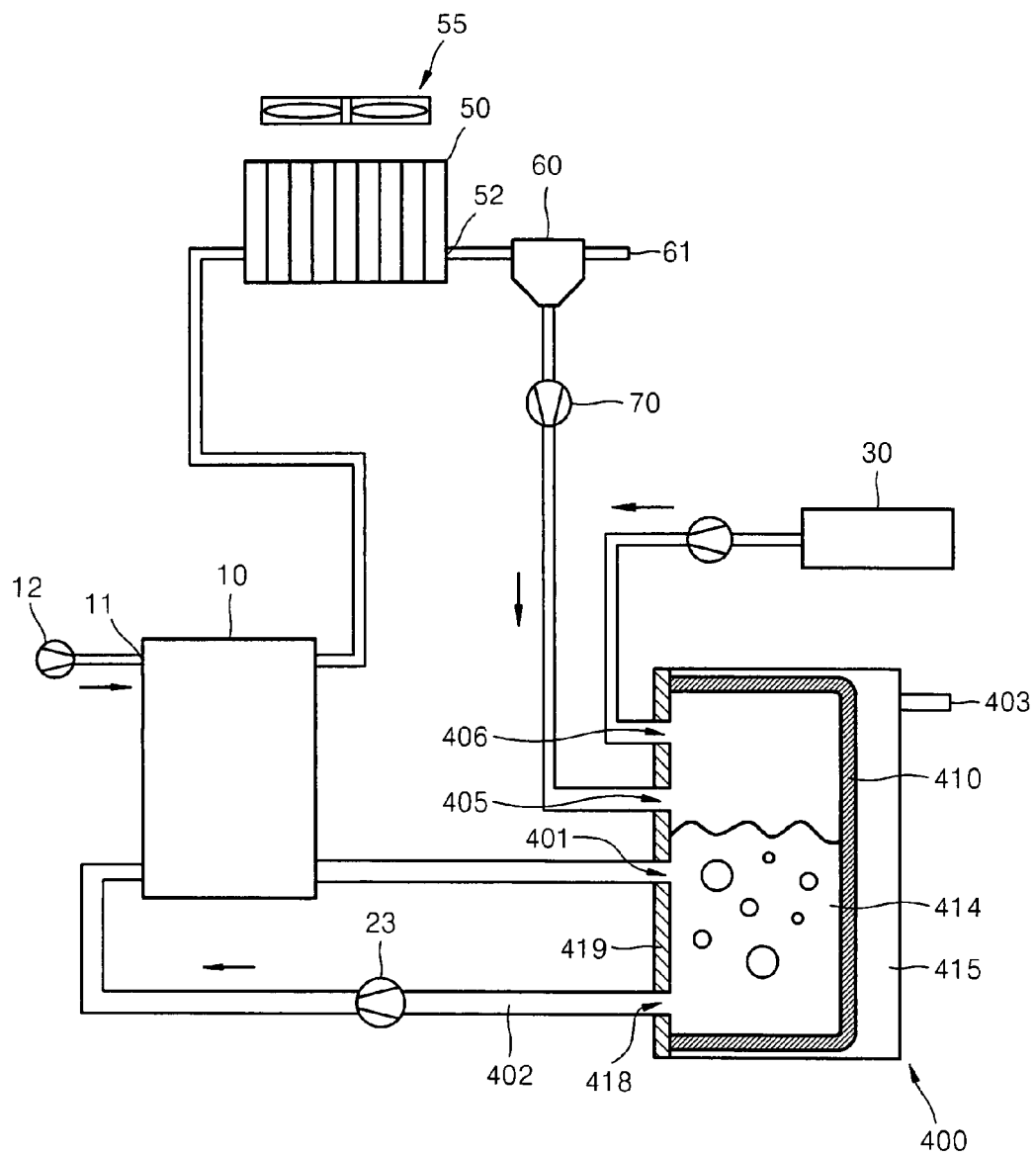
FIG. 5 is a schematic diagram of a fuel cell system wherein a mixer is integrated into a separation device according to another embodiment of the present invention.

FIG. 5 is a schematic diagram of a fuel cell system wherein a mixer is integrated into a separation device according to another embodiment of the present invention. That is, the separation device has the additional function of the mixer integrated into it.

Referring to FIG. 5, in addition to a fluid inlet 401 where two phase fluid from a stack 10 is fed into the separation device 400, fuel from a fuel tank 30 is injected through a fuel inlet 406, and condensed water from a water separator 60 is injected through a water inlet 405.

In another embodiment of the present invention, only the fuel or the condensed water may be injected into the combined carbon dioxide separation/mixer device 400, the other liquid being injected into an anode cycle at a different position.

In order to increase the membrane area in a given volume, a membrane 410 may be of a bent shape.

In this embodiment of the present invention, a backpressure is generated and transmitted, through a small orifice 418 in a wall 419 of the separation device 400 forming a reduced aperture, via a tubing connection 402 and pump 23 to an anode inlet of stack 10.

Figure 6:
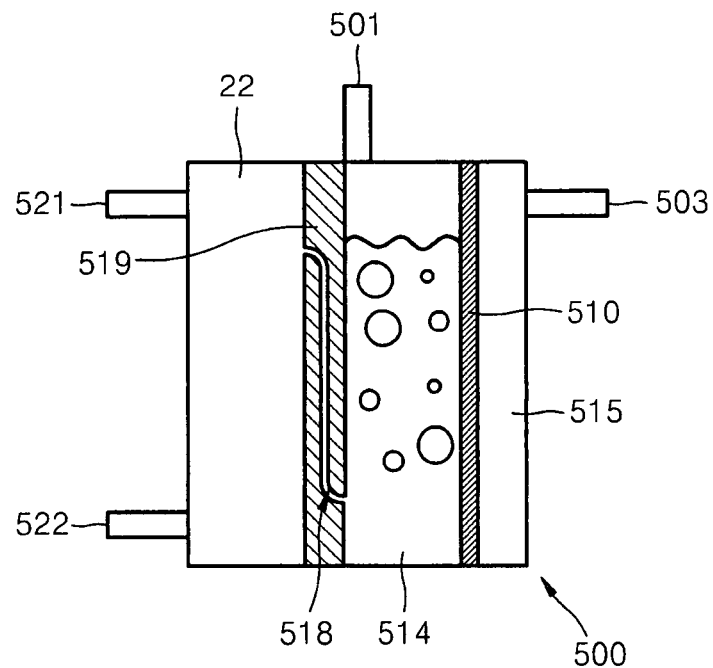
FIG. 6 is a schematic diagram of the fuel cell system illustrated in FIG. 3 wherein a separation device is attached to a mixer according to another embodiment of the present invention.

FIG. 6 is a schematic diagram of the fuel cell system illustrated in FIG. 3 wherein a separation device is attached to a mixer according to another embodiment of the present invention.

Referring to FIG. 6, a diaphragm 519 separates a fluid compartment 514 from a mixing compartment 22. A backpressure is generated through a capillary type connection 518 within the diaphragm 519 when fluid flows from the fluid compartment 514 downstream into the mixing compartment 22 from which it exits through a fluid outlet 522 toward a stack anode inlet 521. Through the stack anode inlet 521, fuel and/or condensed water is injected into the mixing compartment 22.

Figure 7:
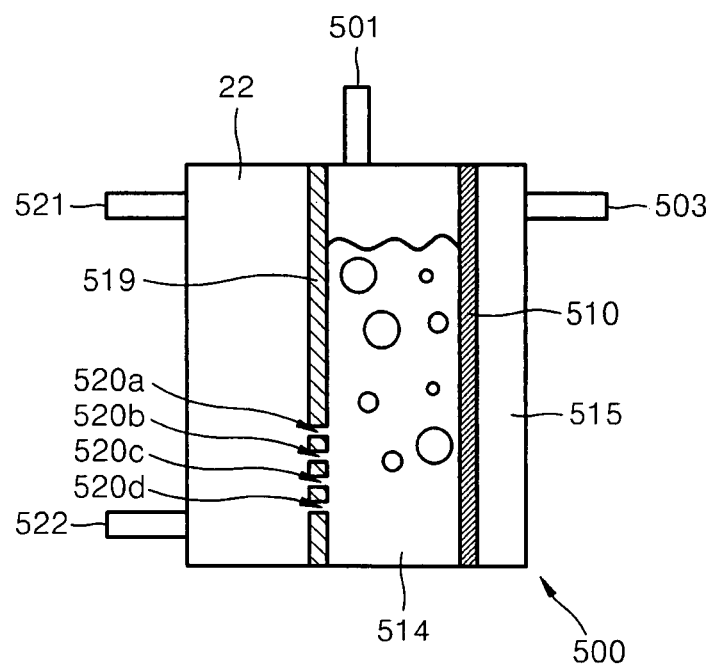
FIG. 7 is a schematic diagram of a separation device with multiple parallel backpressure elements according to another embodiment of the present invention.

Finally, a variation of a backpressure element is shown in FIG. 7, which is a schematic diagram of a separation device with multiple parallel backpressure elements according to another embodiment of the present invention.

Referring to FIG. 7, in order to increase operational reliability against blocking of a backpressure device, multiple parallel backpressure elements 520a, 520b, 520c and 520d can be implemented. This principle can be applied to capillary type, nozzle type and reduced aperture type backpressure devices.

According to the present invention as described above, a carbon dioxide separation system for a fuel cell system having a small volume and weight of a separation device and of the membrane, while simultaneously increasing the separated volume of carbon dioxide, can be implemented.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A carbon dioxide separation system for a fuel cell system, comprising:
a separation device for containing a fluid phase, a carbon dioxide phase, and a two phase fluid including fluid and carbon dioxide, said separation device comprising a two phase fluid inlet, a fluid outlet, a carbon dioxide outlet, a carbon dioxide separation membrane, and a flow restrictor for creating a backpressure which presses separated carbon dioxide through the carbon dioxide separation membrane;
wherein the flow restrictor is mounted downstream of the separation device and comprises at least one narrow aperture; and
wherein the carbon dioxide separation membrane is positioned in the separation device in such a manner that at least a part of a total membrane area is arranged above a two phase fluid level and is in touch with carbon dioxide contained in the separation device above the two phase fluid level;
said carbon dioxide separation system further comprising a mixer, wherein the separation device is attached to the mixer as two compartments in one unit, separated by a diaphragm; and
wherein the flow restrictor is a capillary integrated in the diaphragm.

2. The carbon dioxide separation system of claim 1, wherein the carbon dioxide separation membrane serves as the carbon dioxide outlet.

3. The carbon dioxide separation system of claim 1, wherein the carbon dioxide separation membrane is inside the separation device and is in contact with carbon dioxide.

4. The carbon dioxide separation system of claim 1, wherein the separation device has a pot shape.

5. The carbon dioxide separation system of claim 1, wherein the carbon dioxide phase is located above the two phase fluid, the two phase fluid inlet is arranged on a top of the separation device, and the fluid outlet is arranged on a bottom of the separation device.

6. The carbon dioxide separation system of claim 1, wherein the carbon dioxide outlet is arranged close to a top of the separation device.

7. The carbon dioxide separation system of claim 1, wherein the carbon dioxide outlet is arranged close to a bottom of the separation device.

8. A carbon dioxide separation system comprising:
a separation device for containing a fluid phase, a carbon dioxide phase, and a two phase fluid including fluid and carbon dioxide, said separation device comprising a two phase fluid inlet, a fluid outlet, a carbon dioxide outlet, a carbon dioxide separation membrane, and a flow restrictor for creating a backpressure which presses separated carbon dioxide through the carbon dioxide separation membrane;
wherein the flow restrictor is mounted downstream of the separation device and comprises at least one narrow aperture;
wherein the carbon dioxide separation membrane is positioned in the separation device in such a manner that at least a part of a total membrane area is arranged above a two phase fluid level and is in touch with carbon dioxide contained in the separation device above the two phase fluid level;
wherein the carbon dioxide separation membrane is essentially of tubular shape, which divides the separation device into two essentially co-axial compartments, and wherein the fluid, the two phase fluid, and compressed carbon dioxide are located in an inner fluid compartment, and a carbon dioxide collection compartment surrounds the inner fluid compartment and transfers the separated carbon dioxide to the carbon dioxide outlet; and
wherein the fluid outlet is mounted on a top flange and is elongated into the inner fluid compartment through a collection tube.

9. The carbon dioxide separation system of claim 8, wherein the two phase fluid inlet is also mounted on the top flange.

10. The carbon dioxide separation system of claim 8, wherein a ratio of a total cross section of apertures in the flow restrictor to a cross section of the inner fluid compartment containing the fluid and the two phase fluid in the separation device is not greater than $1/10$.

11. The carbon dioxide separation system of claim 1, wherein the flow restrictor comprises a capillary tube integrated into a tubing connection in a downstream part of the carbon dioxide separation system.

12. The carbon dioxide separation system of claim 1, wherein the flow restrictor comprises a nozzle integrated into a tubing connection in a downstream part of the carbon dioxide separation system.

13. The carbon dioxide separation system of claim 1, wherein the flow restrictor comprises a small orifice in a passage of an outer wall of the separation device to a downstream tubing connection.

14. The carbon dioxide separation system of claim 1, wherein the flow restrictor comprises multiple parallel individual backpressure elements of at least one of capillaries and nozzles of limited aperture type.

15. The carbon dioxide separation system of claim 1, further comprising a mixer which is integrated into the separation device as a single compartment device.

16. The carbon dioxide separation system of claim 1, wherein the carbon dioxide separation membrane has a shape which is one of flat and bent.

17. A carbon dioxide separation system for a fuel cell system, comprising:
a separation device for containing a fluid phase, a carbon dioxide phase, and a two phase fluid including fluid and carbon dioxide, said separation device comprising a two phase fluid inlet, a fluid outlet, a carbon dioxide outlet, a carbon dioxide separation membrane, and a flow restrictor for creating a backpressure which presses separated carbon dioxide through the carbon dioxide separation membrane;
wherein the flow restrictor is mounted downstream of the separation device and comprises at least one narrow aperture;
wherein the carbon dioxide separation membrane is positioned in the separation device in such a manner that at least a part of a total membrane area is arranged above a two phase fluid level and is in touch with carbon dioxide contained in the separation device above the two phase fluid level; and
wherein the flow restrictor comprises one of a capillary tube and a nozzle integrated into a tubing connection in a downstream part of the carbon dioxide separation system.

* * * * *